(12) United States Patent
Obendiek

(10) Patent No.: US 6,592,169 B2
(45) Date of Patent: Jul. 15, 2003

(54) RETRACTABLE TOP WITH REAR-WINDOW CONTROL

(75) Inventor: Klaus Obendiek, Passau (DE)

(73) Assignee: Edscha Cabrie - Dachsysteme GmbH, Hengersberg (DE)

( * ) Notice: Subject to any disclaimer, the term of this patent is extended or adjusted under 35 U.S.C. 154(b) by 0 days.

(21) Appl. No.: 10/116,569

(22) Filed: Apr. 3, 2002

(65) Prior Publication Data

US 2002/0158485 A1 Oct. 31, 2002

(30) Foreign Application Priority Data

Apr. 4, 2001 (DE) ......................................... 101 16 709

(51) Int. Cl.⁷ ................................................ B60J 7/08
(52) U.S. Cl. ............. 296/107.07; 296/108; 296/107.17; 296/146.14
(58) Field of Search ................. 296/107.01, 107.07, 296/107.09, 107.16, 107.17, 108, 146.14

(56) References Cited

U.S. PATENT DOCUMENTS

| | | | | | |
|---|---|---|---|---|---|
| 4,693,509 | A | * | 9/1987 | Moy et al. ................... | 296/201 |
| 4,852,935 | A | * | 8/1989 | Varner ................... | 296/146.14 |
| 5,769,483 | A | | 6/1998 | Danzl et al. ................. | 296/107 |
| 5,975,619 | A | | 11/1999 | Dettling et al. ......... | 296/107.08 |
| 6,039,383 | A | * | 3/2000 | Jambor et al. .............. | 296/108 |
| 6,086,136 | A | * | 7/2000 | Jambor et al. ......... | 296/107.17 |
| 6,123,381 | A | * | 9/2000 | Schenk .................. | 296/107.07 |
| 6,131,988 | A | * | 10/2000 | Queveau et al. ........ | 296/107.17 |
| 6,382,703 | B1 | * | 5/2002 | Queveau et al. ........ | 296/107.17 |
| 2003/0020299 | A1 | * | 1/2003 | Bauer et al. ................. | 296/108 |
| 2003/0025349 | A1 | * | 2/2003 | Foelster et al. ......... | 296/107.01 |

FOREIGN PATENT DOCUMENTS

| | | | | |
|---|---|---|---|---|
| DE | 3416330 | A1 | * 11/1985 | ............. B60J/7/12 |
| DE | 3808910 | A1 | * 10/1989 | ............. B60J/1/18 |
| DE | 4316485 | | 11/1994 | |
| DE | 19642152 | | 4/1998 | |
| EP | 0835778 | | 4/1998 | |
| EP | 0936095 | | 8/1999 | |
| EP | 0956990 | | 11/1999 | |
| FR | 1351390 | A | * 12/1963 | |

* cited by examiner

*Primary Examiner*—D. Glenn Dayoan
*Assistant Examiner*—Patricia Engle
(74) *Attorney, Agent, or Firm*—Davidson, Davidson & Kappel, LLC

(57) ABSTRACT

A retractable top for a motor vehicle, comprising a first and a second main link, a rear roof part, said rear roof part being connected to said first main link a rear-window part, said rear-window part being associated with an aperture in said rear roof part in a closed position of the top, and a link mechanism, said rear-window part being fixed in an articulated manner on the first main link, said rear-window part being connected to the second main link by said link mechanism, and said articulated fixing of the rear-window part on the first main link being provided at an end of said rear-window part.

16 Claims, 5 Drawing Sheets

RETRACTABLE TOP WITH REAR-WINDOW CONTROL

FIELD OF THE INVENTION

The invention relates to a retractable top for a motor vehicle, comprising a first and a second main link, a rear roof part, said rear roof part being connected to said first main link, a rear-window part, said rear-window part being associated with an aperture in said rear roof part in a closed position of the top, and a link mechanism.

DESCRIPTION OF THE PRIOR ART

In the construction of modern convertibles, increasing use is being made of more complex convertible tops, which are constructed, in particular, as multi-part hard-shell retractable tops. Since such retractable tops are used not only on sports vehicles but also for conventional saloons, there are higher requirements with regard to keeping a sufficient luggage-space volume available, even in the open state of the top. Moreover, rear windows made of glass or a hard transparent plastic are increasingly being used on the convertible tops mentioned, making it necessary to deposit these sensitive rear windows in a specially protected location when the top is in an open position.

DE 196 42 152 A1 describes a motor vehicle with a roof that can be lowered, which is divided into a front, a central and a rear section, which can be moved from a common closed position, in which they cover the interior of the vehicle, into an open position, being deposited in a retractable-top compartment at the rear. In this case, a rigid rear window is associated with the rear section of the roof, the rigid rear window being lowered away from the rear section of the roof by means of an additional driving device before a process in which the convertible top is opened. Separate pivoting of a rear window in this way is associated with increased weight, higher costs and a greater space requirement owing to the additional driving device.

EP 0 956 990 A2 describes a motor-vehicle top that can be opened and has a rear roof part and a front roof part connected in an articulated manner to the latter, a rear window being connected in such a way at a joint to the rear roof part that, in a closed state of the top, the rear window is fitted into the rear roof part and, during an opening movement of the top, is pivoted relative to the rear roof part about an axis that runs essentially through the centre of the rear window. In this case, the rear window is rotated essentially through 180° relative to the rear roof part, with the result that, in a lowered position of the top, the rear window is arranged with a convexity opposite to that of the rear roof part. The disadvantage with such pivoting of the rear window of a top that can be opened is that the seal of the rear window relative to the rear roof part is divided at the level of the pivoting axis running essentially centrally through the rear window. In the closed state of the top, the rear window is guided against the rear roof part from the inside above the pivoting axis and from the outside below the pivoting axis in relation to the seal.

SUMMARY OF THE INVENTION

It is an object of the invention to provide a retractable top for a motor vehicle in which a rear window can be pivoted into a protected position in a simple manner during an opening process of the top, without its own driving device.

According to the invention, this object is achieved by a retractable top for a motor vehicle, comprising a first and a second main link, a rear roof part, said rear roof part being connected to said first main link a rear-window part, said rear-window part being associated with an aperture in said rear roof part in a closed position of the top, and a link mechanism, said rear-window part being fixed in an articulated manner on the first main link, said rear-window part being connected to the second main link by said link mechanism, and said articulated fixing of the rear-window part on the first main link being provided at an end of said rear-window part.

In this case, the rear-window part is advantageously fitted in an aperture in the rear roof part of the retractable top in a closed state of the top, is connected pivotally to this rear roof part or a main link connected to the latter, and is connected to the second main link by means of a link mechanism, with the result that the movements of the top's linkage that take place in any case during an opening process of the retractable top can advantageously be used to control the pivotable rear-window part and it is possible to dispense with additional driving devices.

It is furthermore particularly advantageous that a roof segment is provided which likewise fits into the aperture in the rear roof part in the closed state of the top and is fixed on the link mechanism. This means that the roof segment can likewise be pivoted away from the rear roof part during a closing movement of the retractable top, with the result that the aperture in the rear roof part leads to the formation of an end that is open in part. During the opening movement of the top, the roof segment is rotated relative to the rear-window part or rear roof part by means of the link mechanism and is deposited in a space-saving manner above the rear-window part or rear roof part in the open end position.

In an advantageous embodiment of the retractable top according to the invention, the rear roof part can be deposited in a rear area of the vehicle together with the other parts of the top, the open end of the rear roof part essentially pointing downwards, with the result that a through-loading space is formed in the rear area of the vehicle by the aperture. A protected deposited position of the rear window and an enlarged storage volume in the area of the luggage space of the vehicle is thus advantageously achieved at the same time through the pivoting of the rear-window part and the roof segment. The through-loading space is advantageously maintained during the entire movement of the retractable top, with the result that objects deposited in the luggage space for transportation do not have to be removed before opening or closing the top.

In a particularly advantageous embodiment of the present invention, the two main links of the retractable top also serve to control a central roof part and a front roof part connected to the latter by a mechanism. In this case, the front, central and rear roof part are arranged as a roof above a passenger compartment in the closed state, the front roof part being embodied in such a way that it can be raised and moved over the central roof part during a positively controlled opening process, and the three roof parts being embodied in such a way that they can be pivoted together about a main bearing counter to a direction of travel, and it being possible to transfer the front roof part and the central roof part in the same direction over the rear roof part, which can be rotated into a folded-over position, into a stowing position. To avoid other moving closure means, the roof segment is advantageously secured on the central roof part by means of centering pins, stops furthermore being provided, by means of which the roof segment and the central roof part are guided relative to one another in a final part of the closing movement of the retractable top, with the result that the centering pins engage precisely.

In order to ensure particularly advantageous control of the parts of the top, especially in relation to the beginning and end of the opening movement of the top, a driving device is provided which, on the one hand, ensures advantageous distribution, by means of an intermediate link, a control rod and cross links, of a force introduced into the driving device between the two main links and, on the other hand, allows at least one of the two main links to perform a superimposed translatory motion and rotary motion relative to a swivel joint fixed to the main bearing during the movement of the top.

Further advantageous refinements and developments of a retractable top according to the invention are the subject matter of a preferred exemplary embodiment of the invention described below and of the dependent claims.

An embodiment of a retractable top according to the invention is explained in greater detail below with reference to the attached drawings.

DETAILED DESCRIPTION OF A PREFERRED EMBODIMENT

Figure 1:
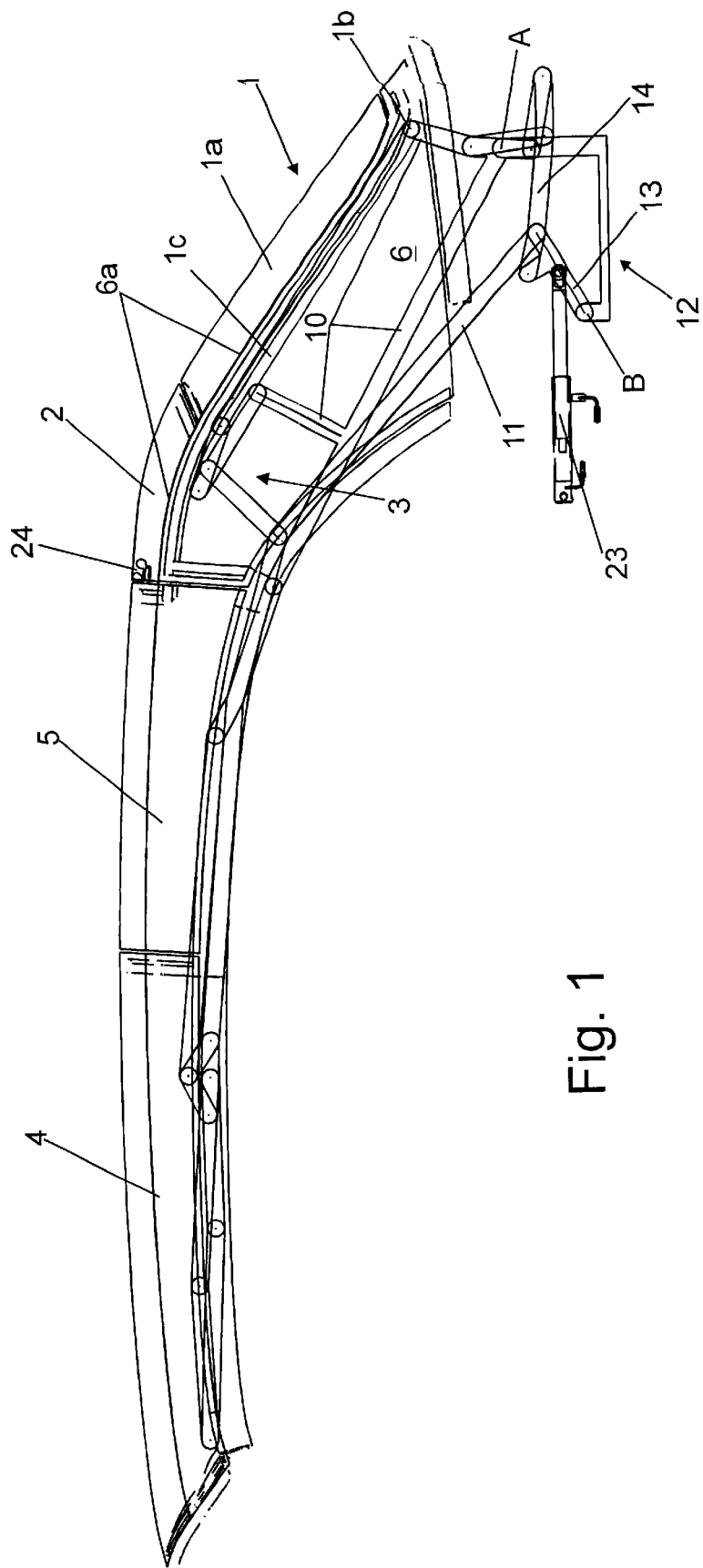
FIG. 1 shows a schematic side view of a preferred exemplary embodiment of a retractable top according to the invention in a closed position of the top.

FIG. 1 shows a retractable top according to the invention, which, in the exemplary embodiment under consideration, comprises a front roof part 4, a central roof part 5 and a rear roof part 6, in a closed position of the top.

A first main link 10 is pivotally connected to a main bearing 12 fixed to the body, in a swivel joint A fixed to the main bearing. A second main link 11 is connected to the main bearing 12 by an intermediate link 13, the intermediate link 13 being fixed pivotably on a swivel joint B fixed to the main bearing. Moreover, the intermediate link 13 is connected in an articulated manner to a control rod 14, and the latter is connected in an articulated manner to the first main link 10. In this arrangement, the control rod 14 is connected to the first main link 10 by a cross-link mechanism, which comprises a first cross-link 14a and a second cross-link 14b. In this arrangement, the cross-links 14a, 14b are each pivotally connected to the control rod 14 at one end and to the first main link 10 at the other end, in the region of the first swivel joint A fixed to the main bearing.

A rear-window part 1, which is fitted into an aperture 6a in the rear roof part 6 in a closed position of the top shown in FIG. 1, comprises a rear window 1a and a carrier link 1c, which is firmly connected to the rear window 1a. The term "rear window" 1a here includes not only a glass or plastic window but also frame parts and sealing means surrounding the window. The carrier link 1c is pivotally connected to the first main link 10 at one end, in a joint 1b. In this arrangement, the first main link 10 is in the form of a rod with a plurality of branching struts. The carrier link 1c is connected pivotally at its other end to the first and the second main link 10, 11 by a link mechanism 3 comprising a first link 3a, a second link 3b and a control link 3c. In this arrangement, the second link 3b is pivotally connected to the carrier link 1c, and the first link 3a is pivotally connected to the second link 3b and the first main link 10. The control link 3c is connected pivotally to the second main link 11 and the first link 3a. Overall, the first main link 10, the carrier link 1c, the first link 3a and the second link 3b thus form a four-bar linkage which is crossed in the position of the top shown in FIG. 1, this linkage being controlled by the control linkage 3c and, together with the latter, forming the link mechanism 3.

A roof segment 2 is firmly connected to the second link 3b of the link mechanism and, in the closed position of the top as shown in FIG. 1, is fitted into the aperture 6a in the rear roof part 6. In this fitted state, the roof segment 2 forms part of the front edge of the rear roof part 6, the edge facing the central roof part 5. Owing to the aperture 6a, the rear roof part 6 itself consists mainly of segments which are each arranged laterally on the vehicle and which form C pillars of the vehicle in the closed position of the top. In the region in which the roof segment 2 rests against the central roof part 5, centering pins and stops 24 are formed, with the result that the central roof part 5 and the roof segment 2 are guided on one another by means of the stops 24 and secured by means of the centering pins 24 in a final portion of a closing movement of the retractable top.

Figure 2:
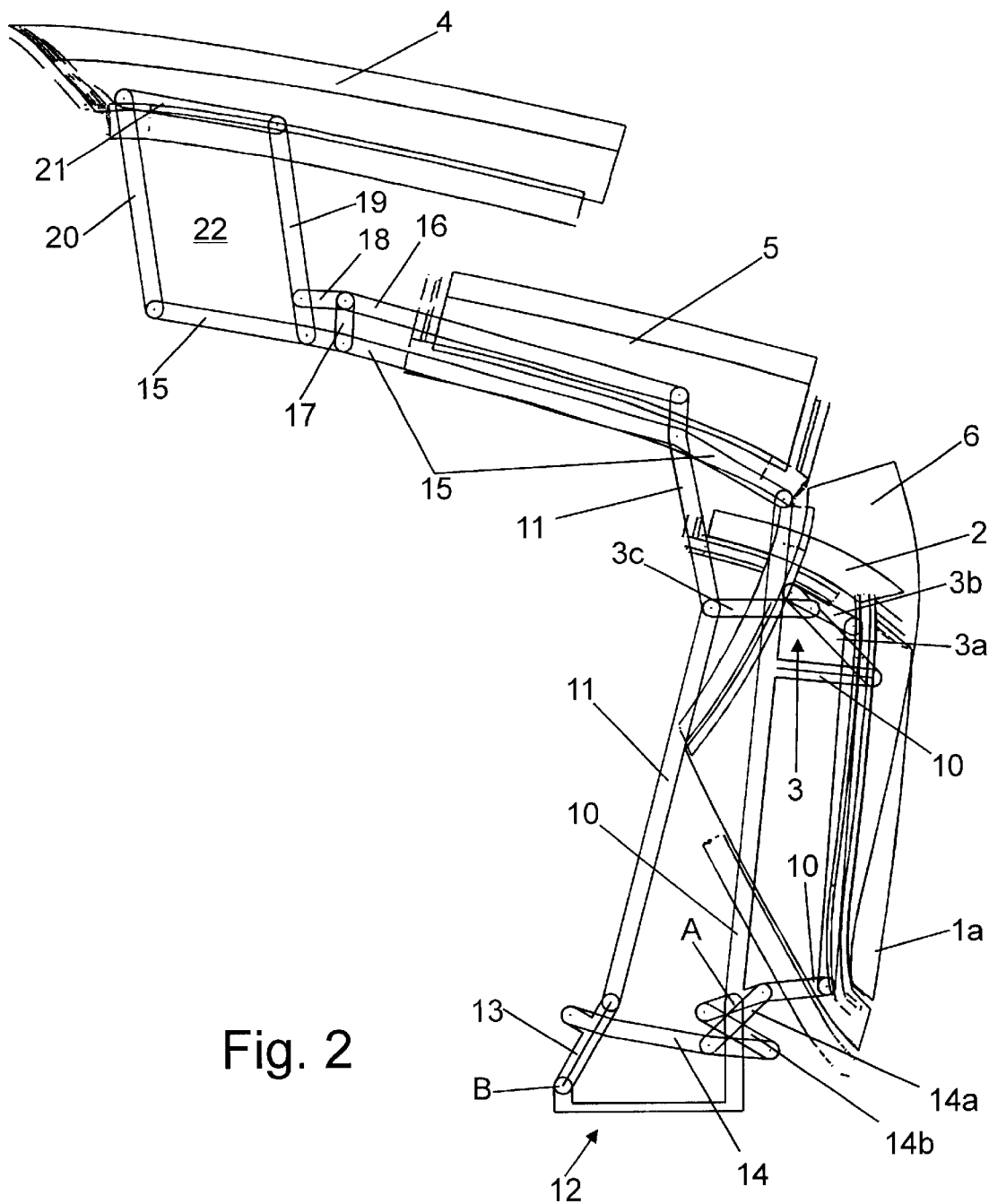
FIG. 2 shows the retractable top from FIG. 1 in a first stage of the opening movement.

As can be seen from FIG. 2, the two main links 10, 11 are connected in an articulated manner to one another by means of a long link 15, the long link 15 simultaneously supporting the central roof part 5.

A central control link 16 is connected to the second main link 11, on the one hand, and to a leg-type link 17, on the other hand, the leg-type link 17 being connected at the other end to the long link 15. A push and pull link 18, which is likewise connected in an articulated manner to the swivel joint connecting the leg-type link 17 and the central control link 16, controls a four-bar linkage 22, which supports the front roof part 4, the four-bar linkage 22 being formed by two links 19, 20, a front carrier link 21 and an end region of the long link 15.

A driving force is introduced into the linkage of the top in the region of the main bearing by means of a drive cylinder 23 pivotally connected to the intermediate link 13. For the sake of greater clarity, the drive cylinder 23 is shown only in FIG. 1.

The invention operates as follows:

Starting from the closed position of the top as shown in FIG. 1, a tensile force exerted by the drive cylinder 23 leads to clockwise pivoting of the first and the second main link 10, 11 about the main bearing. Owing to the movement of the intermediate link 13, the second main link 11 simultaneously performs a translatory motion, which takes place principally in its longitudinal direction. In the first open position of the top as shown in FIG. 2, the rear roof part 6 is pivoted clockwise towards the vehicle body and the central roof part 5 is pivoted counterclockwise towards the rear roof part 6. The front roof part 4 performs a pivoting motion above the central roof part 5. It can also be seen that the roof segment 2 moves out of the aperture 6a in the rear roof part 6, this being due to the motion of the second main link 11 relative to the first main link 10. In FIG. 2, the rear-window part 1 is pivoted counterclockwise away from the rear roof part 6 about the joint 1b.

Figure 3:
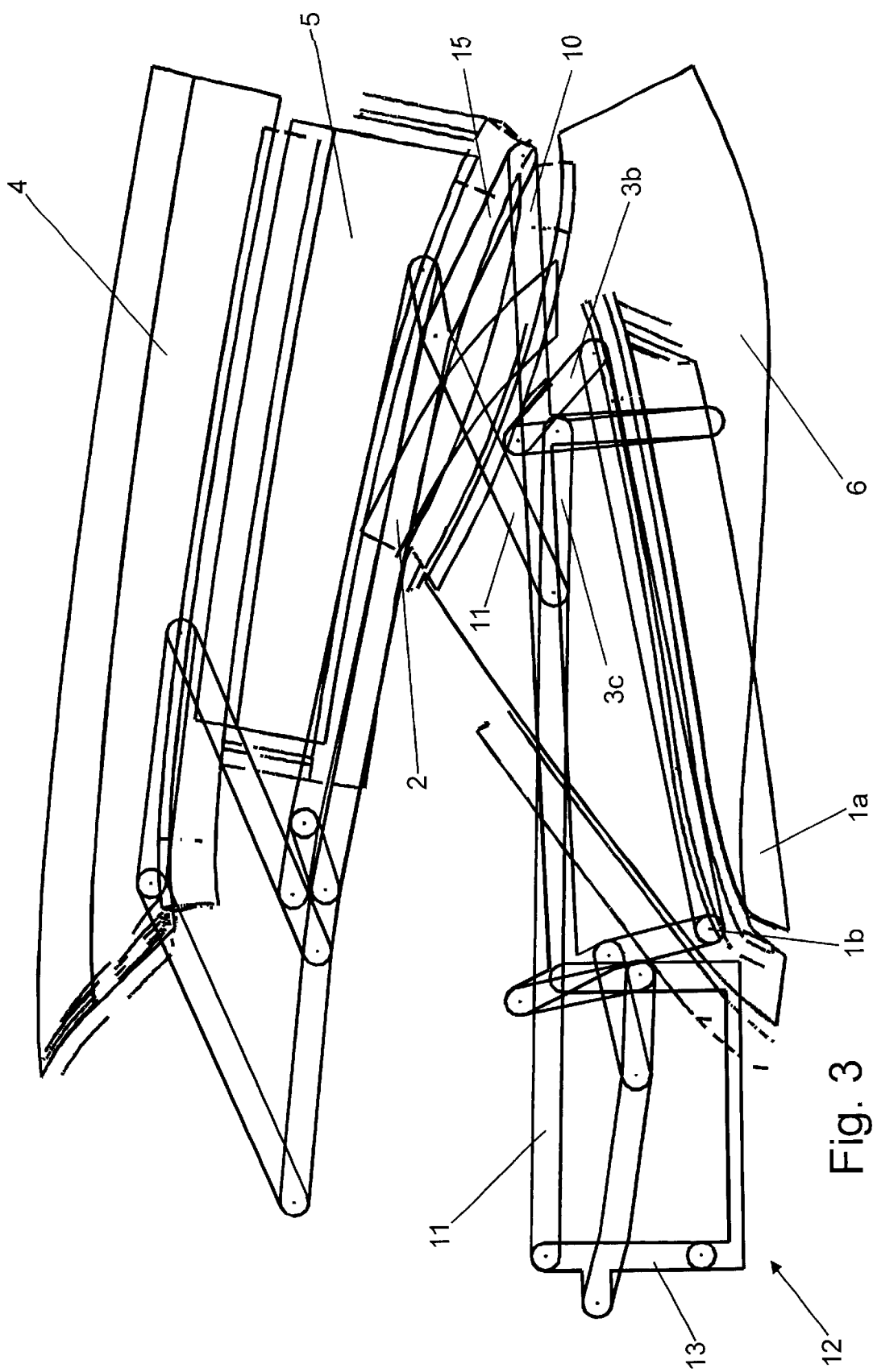
FIG. 3 shows the retractable top from FIG. 1 in a second stage of the opening movement.

In a second stage of the opening movement in accordance with FIG. 3, it is already possible to discern an arrangement of the individual parts of the top corresponding to the end position of the retractable top. During this process, the front roof part 4 comes to lie in the same direction above the central roof part 5, the front and the central roof part 4, 5 being oriented in the direction of travel and arranged above the rear roof part 6, which has been pivoted counter to the direction of travel. The roof segment 2 has been pivoted approximately in the opposite direction to the rear roof part 6, and the rear-window part 1 can be seen to have been pivoted away from the aperture 6a associated with it in the rear roof part 6.

Figure 4:
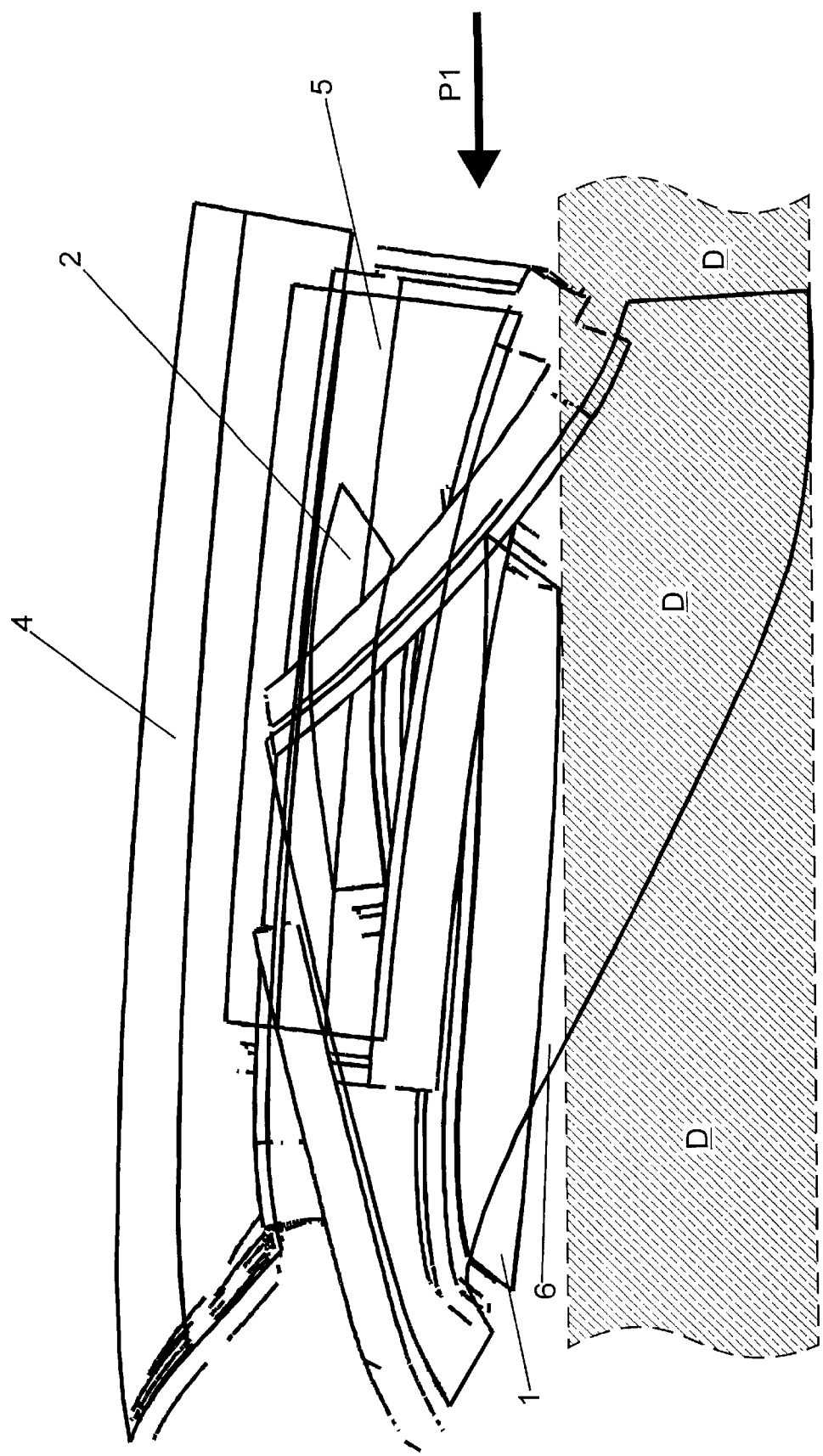
FIG. 4 shows the retractable top from FIG. 1 in an open position, some parts of the drive linkage having been omitted for the sake of greater clarity.

The final stowing position of the open retractable top in the rear area of the vehicle is illustrated in FIG. 4, the parts of the linkage having been omitted for reasons of greater clarity. The arrangement of the front roof part 4 above the central roof part 5 can be seen, both parts pointing in the direction of travel and coming to rest above the rear roof part 6, which has been pivoted counter to the direction of travel. The roof segment 2 and the rear-window part 1 are in a protected position between the central roof part 5 and the rear roof part 6.

Figure 5:
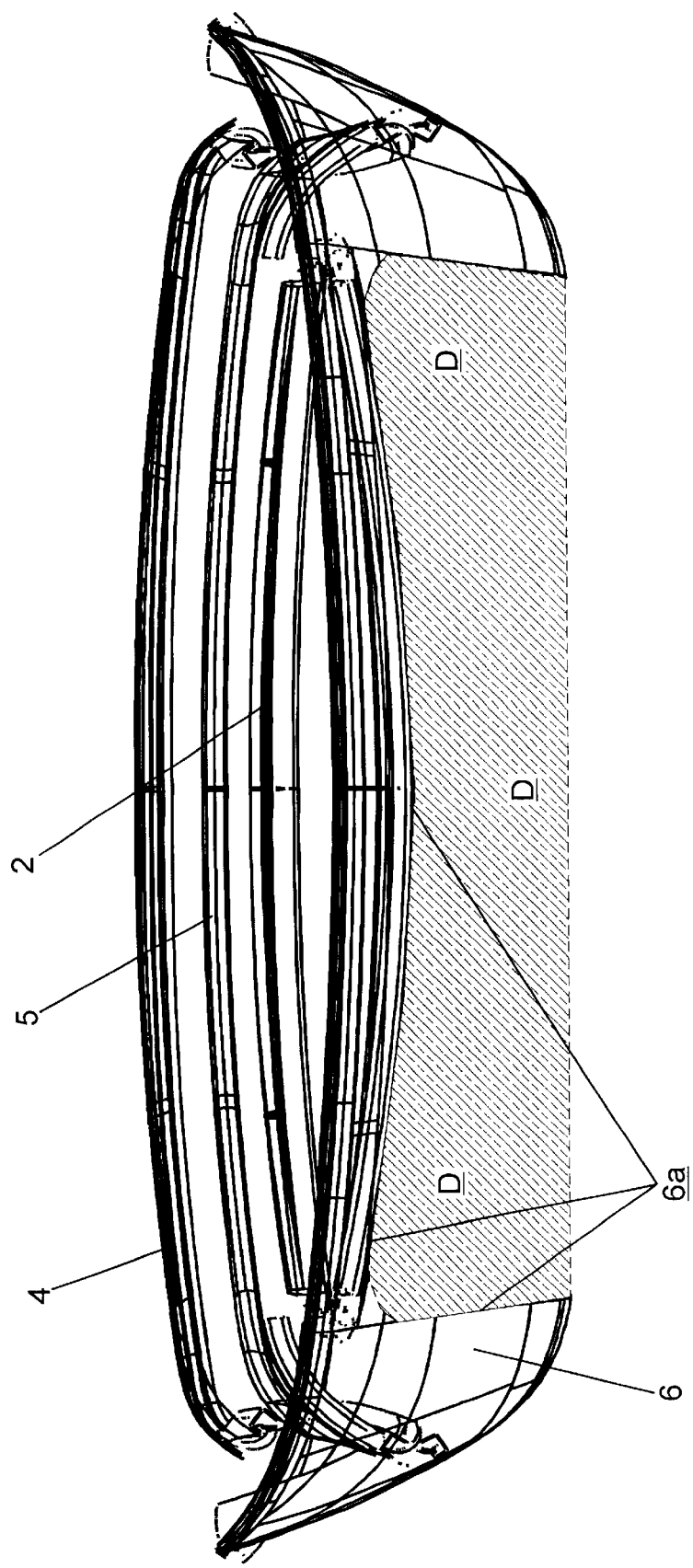
FIG. 5 shows a perspective plan view of the retractable top in the position shown in FIG. 4, viewed in the direction of arrow P1 in FIG. 4.

Owing to the fact that the aperture 6a in the rear roof part 6 is continuous as far as the front end of the rear roof part 6, the end facing the central roof part 5, there is a through-loading space D in the deposited position shown in FIG. 4, as can be seen, in particular, from the perspective plan view of the roof parts in the deposited position shown in FIG. 5. The cross-sectional area of the said through-loading space D corresponds to the cross-sectional area, shown in FIG. 5, of the aperture 6a.

What is claimed is:

1. A retractable roof for a motor vehicle, comprising:
   a first and a second main link;
   a rear roof part, said rear roof part being a hard-shell part and said rear roof part being connected to said first main link;
   a rear-window part, said rear-window part being associated with an aperture in said rear roof part in a closed position of the top, and
   a link mechanism;
   said rear-window part being fixed in an articulated manner on the first main link;
   said rear-window part being connected to the second main link by said link mechanism, and
   said articulated fixing of the rear-window part on the first main link being provided at an end of said rear-window part.

2. Retractable top according to claim 1, wherein the two main links are connected to a main bearing fixed to the body, the two main links being pivotable essentially parallel to one another about the main bearing.

3. Retractable top according to claim 1, wherein the rear roof part is firmly connected to the first main link.

4. Retractable top according to claim 1, wherein a roof segment is provided, the roof segment being connected to the link mechanism.

5. Retractable top according to claim 4, wherein, in the closed position of the top, the roof segment is associated with the aperture in the rear roof part and adjoins an end of the rear-window part.

6. Retractable top according to claim 1, wherein the link mechanism comprises a first and a second link and a control link.

7. Retractable top according to claim 6, wherein the first link is connected in an articulated manner at its one end to the first main link and at its other end to one end of the second link, in that the second link is connected in an articulated manner at its other end to the rear-window part, and in that the control link is connected in an articulated manner at one end to the second main link and at its other end to the first link.

8. Retractable top according to claim 6, wherein the first link, the second link, the first main link and the rear-window part together form a crossed four-bar linkage.

9. Retractable top according to claim 6, wherein a roof segment is firmly connected to the second link.

10. Retractable top according to claim 1, characterized by a driving device for the retractable top, said driving device comprising a main bearing, the first main link, the second main link, a long link, via which the ends of the first and second main link which face the retractable top are connected in an articulated manner, and a first swivel joint being fixed to the main bearing, for connecting the first main link pivotally to the main bearing, the second main link being connected pivotally to one end of an intermediate link, the intermediate link being connected pivotally at the other end to a second swivel joint being fixed to the main bearing, of the main bearing, and a control rod being connected pivotally at one end to the intermediate link and being connected at its other end to the first main link, in the region of the first swivel joint, which is fixed to the main bearing.

11. Retractable top according to claim 1, comprising a front, a central and the rear roof part, which are arranged as a roof over a passenger compartment in the closed state, it being possible, during a positively controlled opening process, for the front roof part to be raised and moved over the central roof part, and the three roof parts being embodied in such a way that they can be pivoted together about the main bearing counter to a direction of travel, and it being possible to transfer the front roof part and the central roof part in the same direction over the rear roof part, which can be rotated into a folded-over position, into a stowing position.

12. Retractable top according to claim 11, wherein a roof segment is guided and secured on the central roof part by means of centring pins and stops in the closed position of the top.

13. Retractable top according to one of claim 1, wherein a C-pillar of the motor vehicle is formed by the rear roof part.

14. Retractable top according to claim 1, wherein an end that is open in part is formed by the aperture in the rear roof part.

15. Retractable top according to claim 14, wherein, in an open position of the top, the rear roof part is deposited in a rear area of the vehicle, the open end of the rear roof part essentially pointing towards the floor of the vehicle, and a through-loading space being formed in the rear area of the vehicle by the aperture in the rear roof part.

16. Retractable top according to claim 15, wherein the through-loading space is present during the entire movement of the retractable top from the closed position into the open position of the top.

* * * * *

UNITED STATES PATENT AND TRADEMARK OFFICE
CERTIFICATE OF CORRECTION

PATENT NO. : 6,592,169 B2
DATED : July 15, 2003
INVENTOR(S) : Obendiek

It is certified that error appears in the above-identified patent and that said Letters Patent is hereby corrected as shown below:

<u>Title page,</u>
Item [73], Assignee, should read:
-- Edscha Cabrio - Dachsysteme GmbH, Hengersberg (DE) --.

Signed and Sealed this

Twenty-eighth Day of February, 2006

JON W. DUDAS
*Director of the United States Patent and Trademark Office*